(12) United States Patent
Mclean et al.

(10) Patent No.: US 10,317,514 B2
(45) Date of Patent: Jun. 11, 2019

(54) PROGRAMMABLE APPARATUS FOR SYNTHESIZED FILTER NOTCH

(71) Applicant: Raytheon Company, Waltham, MA (US)

(72) Inventors: Chris S. Mclean, Redondo Beach, CA (US); Harry B. Marr, Jr., Manhattan Beach, CA (US); Ray T. Hsu, Rancho Palos Verdes, CA (US)

(73) Assignee: Raytheon Company, Waltham, MA (US)

( * ) Notice: Subject to any disclaimer, the term of this patent is extended or adjusted under 35 U.S.C. 154(b) by 608 days.

(21) Appl. No.: 14/823,462

(22) Filed: Aug. 11, 2015

(65) Prior Publication Data

US 2017/0045608 A1 Feb. 16, 2017

(51) Int. Cl.
*G01S 7/38* (2006.01)
*G01S 7/02* (2006.01)
*G01S 7/282* (2006.01)
*G01S 13/26* (2006.01)
*H04K 3/00* (2006.01)

(52) U.S. Cl.
CPC ............... *G01S 7/38* (2013.01); *G01S 7/023* (2013.01); *G01S 7/282* (2013.01); *G01S 13/26* (2013.01); *H04K 3/28* (2013.01); *H04K 3/42* (2013.01)

(58) Field of Classification Search
CPC ........................................................ G01S 7/38
USPC .......................................................... 342/14
See application file for complete search history.

(56) References Cited

U.S. PATENT DOCUMENTS

| | | | |
|---|---|---|---|
| 3,369,189 | A | 2/1968 | Hoffman et al. |
| 3,375,451 | A | 3/1968 | Borelli et al. |
| 3,946,328 | A | 3/1976 | Boctor |
| 5,235,223 | A | 8/1993 | Maple |
| 5,598,440 | A | 1/1997 | Domagala |
| 6,201,457 | B1 | 3/2001 | Hickernell |
| 6,556,080 | B1 | 4/2003 | Stengel et al. |

(Continued)

FOREIGN PATENT DOCUMENTS

| | | |
|---|---|---|
| CA | 2852383 A1 | 7/2014 |
| CN | 1409485 A | 4/2003 |

(Continued)

OTHER PUBLICATIONS

"International Application Serial No. PCT/US2016/046284, International Search Report dated Nov. 3, 2016", 5 pgs.

(Continued)

*Primary Examiner* — Peter M Bythrow
*Assistant Examiner* — Helena H Seraydaryan
(74) *Attorney, Agent, or Firm* — Schwegman Lundberg & Woessner, P.A.

(57) ABSTRACT

Generally discussed herein are systems, apparatuses, and methods for generating a replica of a first signal with a notch at one or more desired frequencies. In an example, an apparatus can include a pulse cataloger configured to analyze the first signal and to provide phase modulation information about the first signal, a direct digital synthesizer having an output and configured to modulate a second signal using the phase modulation information and to provide the second signal at the output. The second signal can include a representation of the first signal with a frequency notch at a particular center frequency within the bandwidth of the second signal.

20 Claims, 6 Drawing Sheets

(56) References Cited

U.S. PATENT DOCUMENTS

| | | |
|---|---|---|
| 6,718,166 B2 | 4/2004 | Cordone et al. |
| 6,785,345 B2 | 8/2004 | Blazo |
| 7,787,533 B2 | 8/2010 | Atherton |
| 8,013,690 B2 | 9/2011 | Miyashiro |
| 8,269,480 B2 | 9/2012 | Max et al. |
| 8,571,243 B2 | 10/2013 | Komagel et al. |
| 2005/0041728 A1* | 2/2005 | Karlsson .................. H04K 3/42 375/219 |
| 2010/0283656 A1* | 11/2010 | Zavrel, Jr. ................. G01S 7/38 342/14 |
| 2014/0362774 A1* | 12/2014 | Marr ........................ H04K 3/42 370/329 |

FOREIGN PATENT DOCUMENTS

| | | |
|---|---|---|
| EP | 0736971 A1 | 10/1996 |
| EP | 1913700 A2 | 4/2008 |
| KR | 101404454 B1 * | 6/2014 |
| KR | 101404454 B1 | 6/2014 |
| WO | WO-1998050908 A1 | 11/1998 |
| WO | WO-2017027556 A1 | 2/2017 |

OTHER PUBLICATIONS

"International Application Serial No. PCT/US2016/046284, Written Opinion dated Nov. 3, 2016", 9 pgs.

"International Application Serial No. PCT/US2016/046284 International Preliminary Report on Patentability dated Feb. 22, 2018", 11 pgs.

* cited by examiner

US 10,317,514 B2

PROGRAMMABLE APPARATUS FOR SYNTHESIZED FILTER NOTCH

TECHNICAL FIELD

Embodiments discussed herein generally relate to systems and methods for replicating a externally generated signal with a frequency notch in the replicated signal.

BACKGROUND

Signal jamming is a defensive technique that can be used to defeat wireless detection. Signal jamming can include generating wideband signal energy. However, it is also desirable by parties employing signal jamming to use one or more bands within a jamming spectrum for communication. Existing solutions for providing a frequency notch in a jamming signal can introduce issues that render the solution impractical, for example, simple notch filters can introduce undesirable frequency spurs in the jamming signal while sophisticated filters can be impractical because of the extreme size, weight and power resources such a filter can employ.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments or examples discussed in the present document.

DETAILED DESCRIPTION

Figure 1:
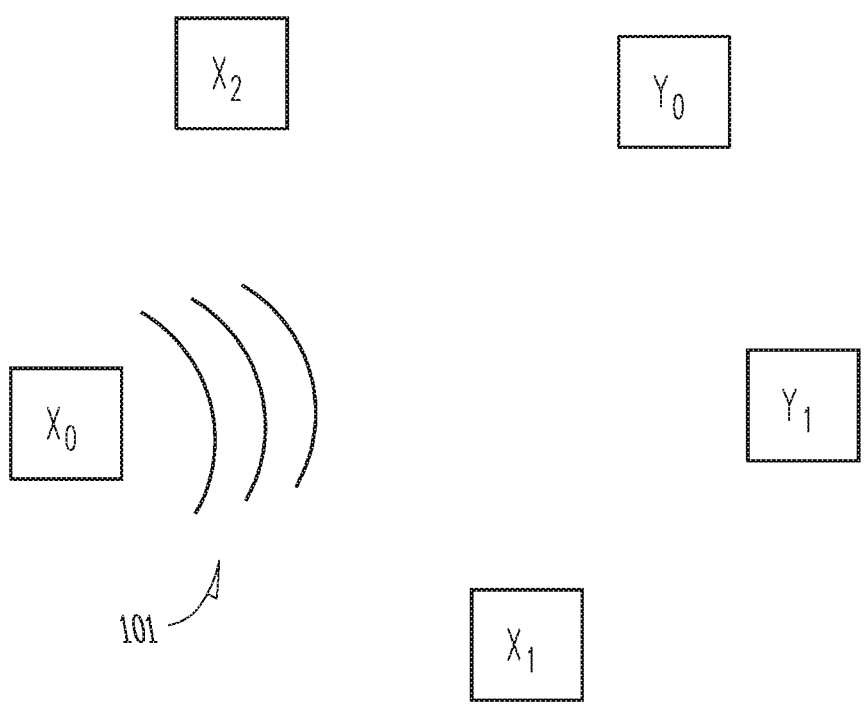
FIG. 1 illustrates generally an example of a radar or jamming scenario including one or more assets of a first team ($X_n$) and one or more assets of a second team ($Y_n$) within relatively close proximity to each other.

Signal jamming is a defensive technique that can be used to defeat wireless detection. Signal jamming can include generating wideband signal energy. However, it is also desirable by parties employing signal jamming often to use one or more bands within a jamming spectrum for communication. Existing solutions for providing a frequency notch in a jamming signal can introduce issues that render the solution impractical, for example, simple notch filters can introduce undesirable spurs frequency undesirable spurs in the jamming signal while sophisticated filters can be impractical because of the extreme size, weight and power resources such a filter can require.

The present inventors have recognized various methods and apparatus to receive first signal information and provide second signal information based on the first signal information, where the second signal information can include one or more frequency notches. In an example situation, a processor can receive wideband jamming signal information and can provide a representation of the jamming signal with a frequency notch that can be used for addition communications. In certain examples, a direct digital synthesizer (DDS) can be used to generate a wideband signal such as a jamming signal. In certain examples, post-DDS filtering is not used to create the one or more frequency notches. In certain examples, a first party can generate a jamming signal to jam communication capabilities of a second party. Having a jamming signal with a notch can allow the first party to maintain some communications within the bandwidth of the jamming signal while still transmitting a functional wide band jamming signal. In certain examples, modulation information can be derive from the first signal information. The modulation information that does not produce energy in the desired notch can be used to modulate the second signal.

The present inventors have also recognized that replication and transmission of a received signal can include monitoring and replicating phase starting points within the signal. Such techniques further assist in concealing communication information within the wideband signal. In certain examples, a direct digital synthesizer (DDS) can be used to generate a waveform and act as a local oscillator in the field-programmable gate array/radio frequency (FPGA/RF) pipeline. However, instead of generating a broadband spectrum first and then filtering out the desired pass-frequencies, the signal is modulated with the notch or non-jammed frequencies. In some examples, a comparator or comparator function at the input of the DDS can turn off the DDS by passing, for example, a 0 to the data valid input of the DDS for the non-jam frequencies and can pass a 1 to the data valid for other jamming frequencies. In certain examples, the comparator function can be easily tuneable. The notch filter-effect can be equivalent to the spectral noise floor of the system at little to no additional resources and with no spurs. In certain examples, the system can be easily tuneable after compile to be at any center frequency, of any desired width, and of any number of notches.

FIG. 1 illustrates generally an example of a radar or jamming scenario including one or more assets of a first team ($X_n$) and one or more assets of a second team ($Y_n$) within close wireless communication proximity to each other. In some situations, the assets ($X_n$, $Y_n$) can be military assets such as troops, equipment, vehicles, installations, or combinations thereof, however, the present subject matter is not so limited. In certain examples, a first asset ($X_0$) of the first team ($X_n$) can employ radar signals or communication jamming signals 101 to detect or disrupt the second team ($Y_n$). However, the radar or communication jamming signals 101 can also work to disrupt communications between the assets of the first team ($X_n$). In certain examples, the radar or communication jamming signals 101 generated by the first asset ($X_0$) of the first team ($X_n$) can include one or more frequency notches within the radar signals or communication jamming signals 101 such that the assets of the first team ($X_n$) can continue to communicate using channels within the bandwidth of the radar signals or communication jamming signals 101. In certain examples, the one or more frequency notches can be dynamic. In certain examples, the one or more frequency notches can be programmable. In some examples, the first signal can include a signal received at an antenna, such as a jamming signal or radar signal from an opposing team. In such an example, the communication signal of one team may be concealed in a notch of a signal that replicates an opposing teams jamming signal or radar signal.

Figures 2A, 2B:
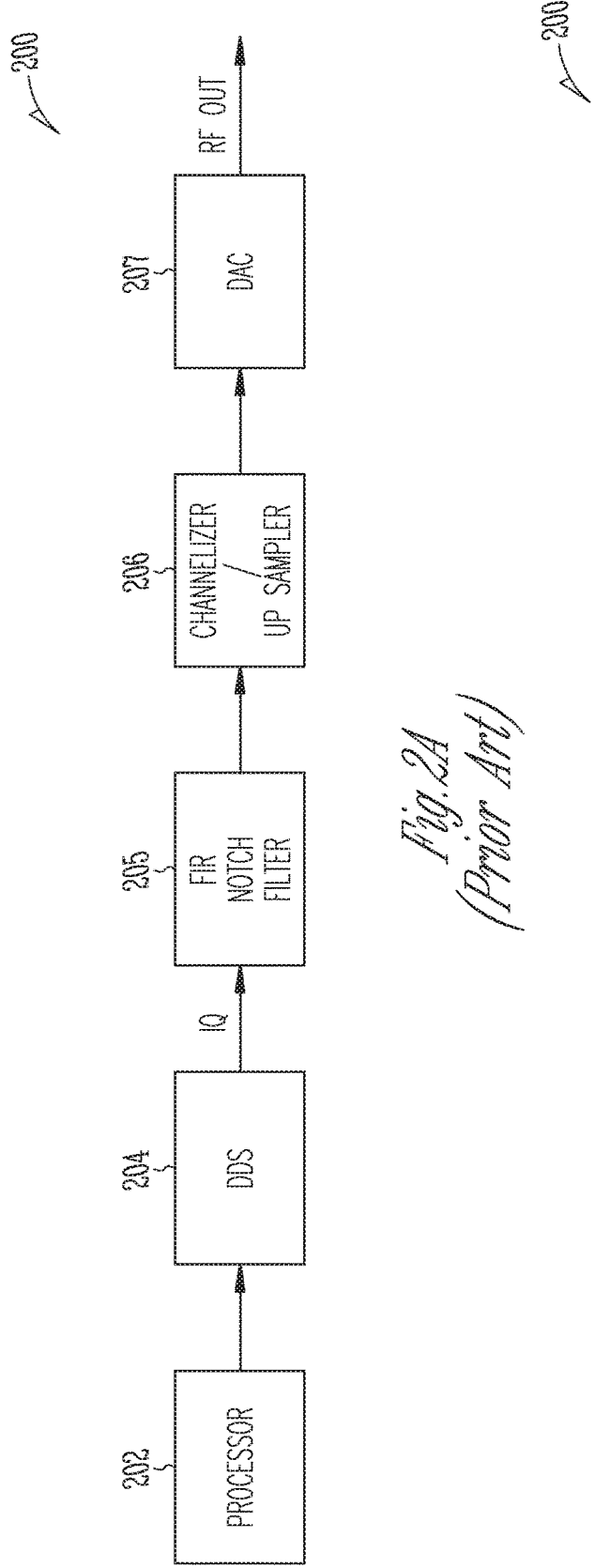
FIGS. 2A and 2B illustrate generally block diagrams for existing apparatus 200 for generating a radar or communication jamming signal with a notch.

FIGS. 2A and 2B illustrate generally block diagrams for existing apparatus 200 for generating a radar or communication jamming signal with a notch. The apparatus 200 can include a main processor 202, a direct digital synthesizer (DDS) 204, channelizer/up-sampler 206, and a digital to analog converter (ADC) 207. The main processor 202 can generate digital modulation information such as frequency or phase increment of the radar or communication jamming signal. The digital modulation information can be received by the (DDS) 204 to produce modulation symbols (I, Q). The channelizer/up-sampler 206 can form a composite output time series composed of relocated spectral fragments of each signal channel and can interpolate the modulation symbols (I,Q). The DAC 207 can convert the composite signal symbols into a radio frequency (RF Out) signal. In FIG. 2A, a finite impulse response (FIR) filter 205 can be employed to modify the modulation symbols (I,Q) before the symbols are interpolated and converted to the radio frequency (RF Out) signal with a desired notch. However, FIR filters, in such a configuration, can require a substantial amount of processing which can also translate into substantial power requirements and chip space. In FIG. 2B, an analog filter 208 can be employed to filter the analog radio frequency signal (RF Out) to create a notch. However, such a solution can require a large analog filter or can introduce distortions in the form of undesirable spurs in the final signal. In either case, substantial costs, over and above costs associated with generating an un-notched signal, are incurred to generate an adequately notched radar or communication jamming signal using the apparatus and methods illustrated in FIGS. 2A and 2B.

Figure 3:
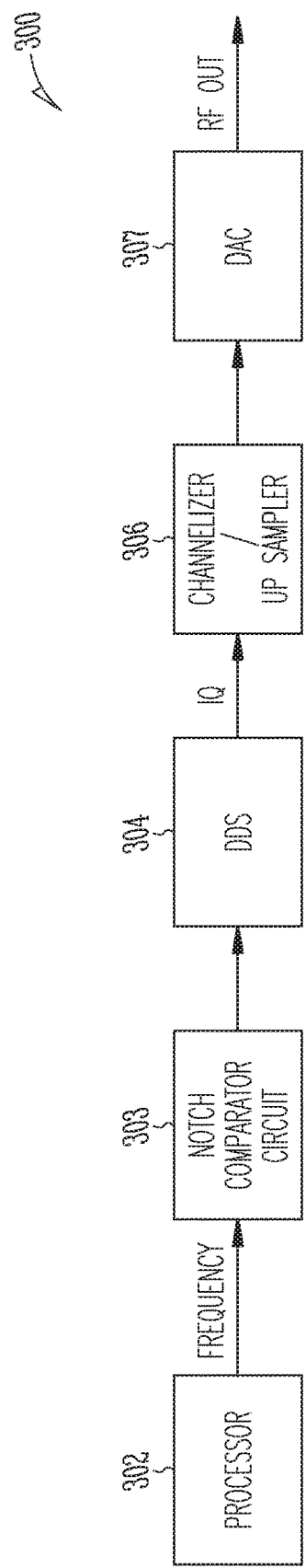
FIG. 3 illustrates generally a block diagram of an example apparatus 300 for generating a radar or communication jamming signal with a notch.

FIG. 3 illustrates generally a block diagram of an example apparatus 300 for generating a radar or communication jamming signal with a notch. The apparatus 300 can include a main processor 302, DDS 304, channelizer/up-sampler 306, and a DAC 307. Unlike the apparatus and methods illustrated in FIGS. 2A and 2B, the example of FIG. 3 includes a notch comparator circuit 303 that can process the modulation information at the input of the DDS 304 to provide modulation information that will produce, at the output of the DDS 304, digital signal information including one or more programmable notches. In certain examples, the digital signal information generated at the output of the DDS 304 can be interpolated at the channelizer/up-sampler 306 and converted to an RF signal using the DAC 307 without additional post-DDS digital notch filtering or analog notch filtering.

Figure 4:
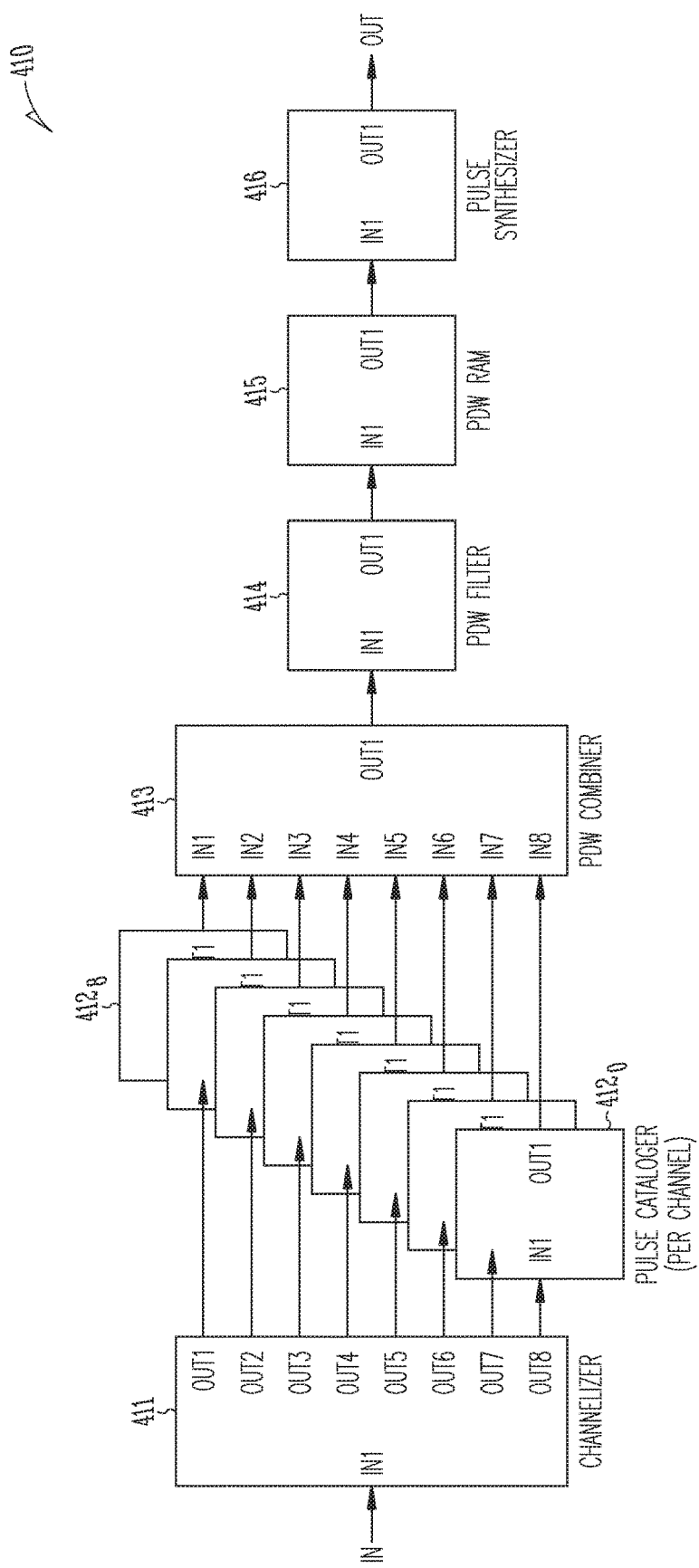
FIG. 4 illustrates generally an example of a system for replicating radar or communication jamming signal information with one or more programmable notches.

FIG. 4 illustrates generally an example of a system 410 for receiving radar or communication jamming signal information (IN), detecting modulation information and replicating the radar or communication jamming signal information (IN) with one or more programmable notches using a DDS of a pulse synthesizer 416. In certain examples, the system 410 can includes channelizer 411, a pulse cataloger 412 for each channel, a pulse description word (PDW) combiner 413, an optional PDW filter 414, optional PDW memory 415 and the pulse synthesizer 416 including a notch comparator circuit and a DDS. In certain examples, the channelizer 411 can receive digital information for the un-notched radar or communication jamming signal (IN) and can divide the signal information into sub-channels ($Out_n$), or can generate channelized information for multiple sub-channels ($Out_n$), spanning the bandwidth of the radar or communication jamming signal. The channelized information ($Out_n$) can be provided to a pulse cataloger $412_n$ associated with each of the channels.

In certain examples, a pulse cataloger $412_n$ can generate pulse description words (PDWs) that provide modulation information about the digital sub-channel information ($Out_n$). In certain examples, each pulse cataloger $412_n$ can include a CORDIC converter to convert the raw digital sub-channel information ($Out_n$) into phase and amplitude information. In certain examples, a cataloger processor of the pulse cataloger $412_n$ can use the phase and amplitude information to generate each PDW. A PDW can describe detectable aspects of the channel phase modulation. In certain examples, the PDW can describe detectable aspects of the channel amplitude modulation. From amplitude and phase, for example, the cataloger processor can measure or infer many things about the channel signal. For example, the difference between phase measurements over time can provide an indication of center frequency. The cataloger processor can measure the phase overtime and if the phase changes linearly, exponentially, or in some form of rising or falling pattern, the signal can be described as a "chirp" and characteristics of the chip can be further measured and described in the PDW. If the phase measurement over time includes a phase discontinuity, the modulation may represent some form of phase keying and additional measurements can be made by the cataloger processor to provide parameters in the PDW describing the specifics of the phase key modulation of the channel. In certain examples, in addition to the above described phase modulation information, the PDW can also include timestamps that describe for example phase start location information. The phase start location information can accurately maintain phase of the output signal relative to other aspects of the signal especially during synthesis of phase shift events or phase discontinuity events described by the digital information received at the channelizer 411. Other parameters in a PDW can include but are not limited to, amplitude modulation information, a parameter indicative of pulse width of a pulse of the first signal information, a parameter indicative of a reception time of a pulse of the first signal information, a parameter indicative of a center frequency the first signal information, a parameter indicative of an initial phase value the first signal information, a parameter indicative of an amplitude of the first signal information, a parameter indicative of inter-pulse modulation information of the first signal information, or combinations thereof.

In certain examples, the PDW combiner 413 can analyze modulation parameters that may extend across multiple sub-channels and can further enhance the information provided in the PDWs to provide multi-channel phase modulation information. For example, if the signal includes a "chirp", or other wide-band signal, energy associated with the signal will most likely, but not always, span multiple channels and the PDW combiner 413 can capture the multi-channel information and supplement the information of appropriate PDWs.

In certain examples, the system can include an optional PDW memory 415 that can buffer the PDWs prior to processing by the pulse synthesizer 416.

In certain examples, the digital signal information received by the system can include ambient signals that are not relevant. For example, the digital signal information may include detected signals that are not relevant, such as a cell phone signal. In certain examples, the PDW filter 414 can be used to filter out or remove such signals or signal information.

The pulse synthesizer 416 can receive the PDWs, analyze the PDWs for modulation information, and synthesize a digital representation of the radar or communication jamming signal using a DDS. In certain examples, the digital representation can be further up-sampled or interpolated for input to an ADC. In addition to synthesizing the received signal information, the pulse synthesizer 416 can synthesize one or more notches into the final radar or communication jamming signal. The notches can be used to allow additional communication within the bandwidth of the signal described by the initial digital information for the radar or communication jamming signal. In some examples, the pulse synthesizer 416 can include the ADC.

Figure 5:
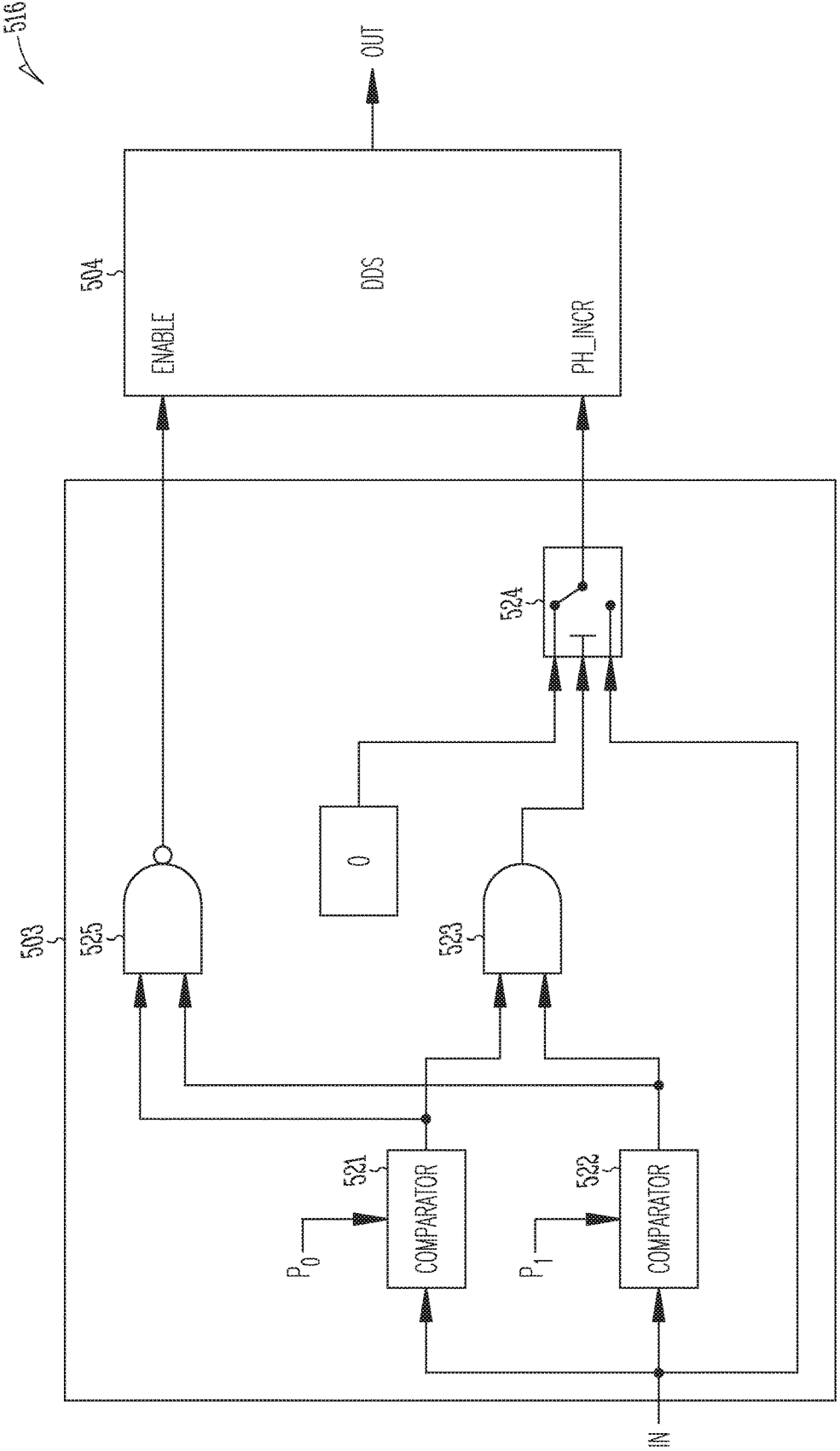
FIG. 5 illustrates generally an example pulse synthesizer including a notch comparator circuit and a DDS.

FIG. 5 illustrates generally an example pulse synthesizer 516 including a notch comparator circuit 503 and a DDS 504. In certain examples, the notch comparator circuit 503 can receive phase increment information (IN) derived from or included in the received PDWs. In certain examples, the notch comparator circuit 503 can include or can receive one or more input parameters ($P_0$, $P_1$), or thresholds, that describe one or more desired frequency notches in the output signal information (OUT) such as a radar or communication jamming signal. In certain examples, the notch comparator circuit 503 can provide a phase increment to the DDS 504 that instructs the DDS in a serial fashion how to synthesize the output signal information (OUT). In certain examples, the input parameters ($P_0$, $P_1$) can be used to provide threshold comparison values to evaluate or determine whether a phase increment will result in substantial energy generation within the one or more desired frequency notches. If the comparisons indicate that a phase increment will not generate energy within one of the desired frequency notches, the phase increment can be passed on to the DDS 504. If the comparisons indicate that a phase increment will generate energy within one of the desired frequency notches, the DDS 504 can be disabled for a cycle or the phase increment input can be held for a cycle. In some examples, a phase transition of the input signal can be adjusted to avoid producing energy within a frequency notch of the output signal using the notch comparator circuit 503 and the DDS 504. In some examples, a transition of the input signal that violates the notch thresholds can be suppressed during modulation of the output signal using the notch comparator circuit 503 and the DDS 504.

Referring to the example of FIG. 5, evaluation of whether a phase increment negatively affects the generation of a desired notch can be accomplished with two comparators 521, 522. In some examples, the output of the comparators can be provided to an AND gate 523 and the AND gate 523 can control a phase increment pass switch 524 can pass the phase increment is to the DDS when there is not a notch violation or can pass a nulled phase increment (0) to the DDS 504 when at least one of the comparators 521, 522 indicate a notch violation. In some examples, the output of the comparators 521, 522 can be provided to a NAND gate 525 and the output of the NAND gate 525 can be used to disable the DDS 504 when the phase increment is evaluated to cause a notch violation and can enable the DDS 504 when a phase increment is evaluated to not cause a notch violation. In certain examples, the DDS 504 can be enabled at all times and the phase increment pass switch can pass or maintain the last phase increment to the DDS 504 when at least one of the comparators 521, 522 can indicate a notch violation. It is understood that the notch comparator circuit 503 can include a different number of comparators without departing from the scope of the present subject matter. Additional comparators can assist in forming additional notches or shaping the width or depth of a particular notch.

Figure 6:
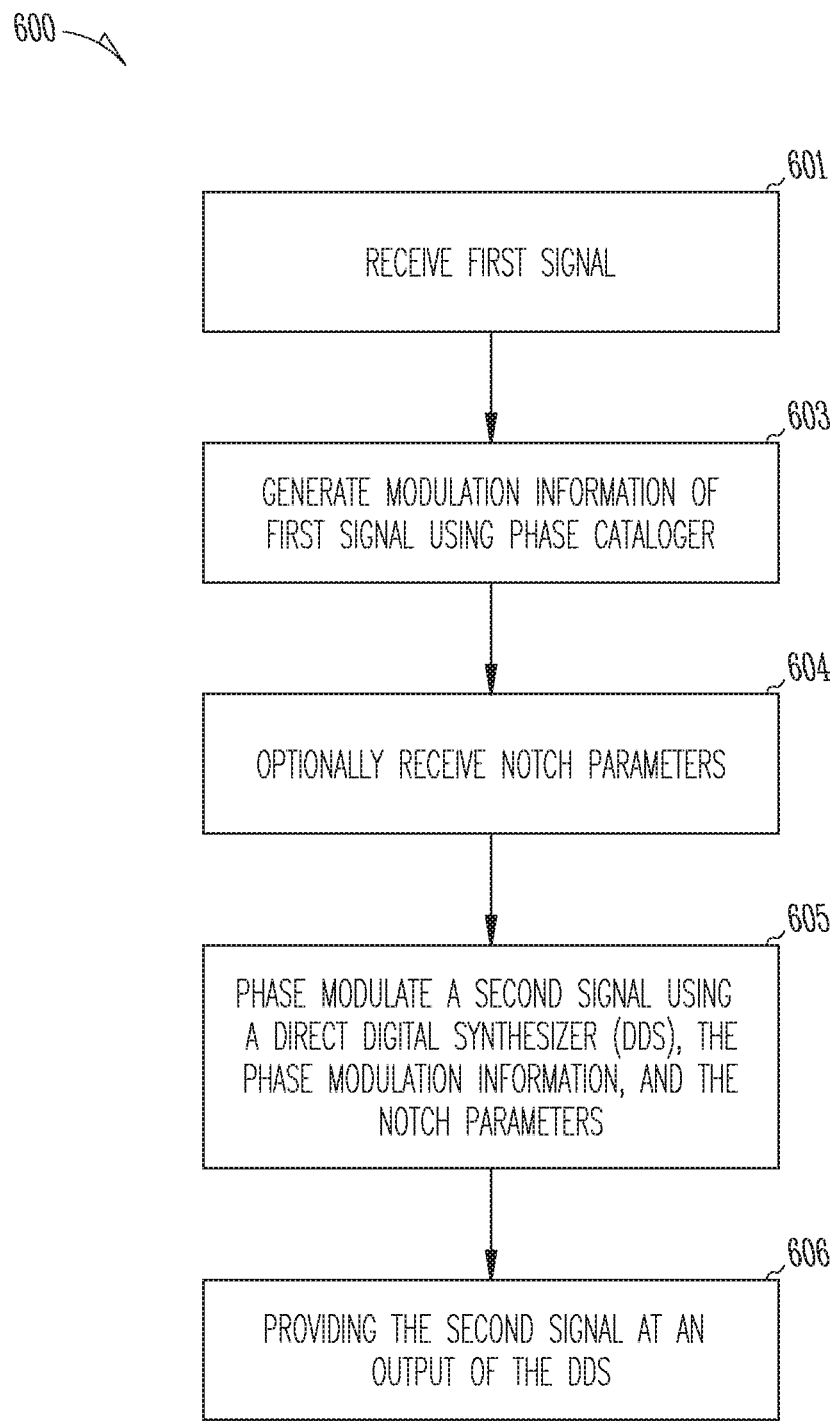
FIG. 6 illustrates generally a flow chart of an example method of generating a signal with one or more notches.

FIG. 6 illustrates generally a flowchart of an example method for creating a notched signal. At 601, a first signal can be received at a signal processor. At 603, a pulse cataloger of the signal processor can evaluate the first signal and can generate phase modulation information about the first signal. At 604, notch parameters can optionally be received at a comparator circuit of a direct digital synthesizer (DDS). In certain examples, the notch parameters can be predetermined and available to the comparator circuit. At 605, the digital synthesizer can use the notch parameters and the phase modulation information to generate and output a second signal. At 606, the second signal can be provided at the output of the DDS and can include a representation of the first signal with a frequency notch within the bandwidth of second signal. In certain examples, the center frequency of the notch can be programmable. In some examples, one of more comparators of the DDS can evaluate whether phase modulation of the first signal will generate significant energy within the notch and can suppress the phase modulation information or provide alternative phase modulation information to preserve the notch in the second signal. In certain examples, except for the notch, the second signal can be a copy of the first signal including a bandwidth commensurate with the bandwidth of the first signal.

Unlike other methods of forming a notch in a signal by processing the synthesized signal information using a FIR or IIR filter, or an analog notch filter, the present subject matter synthesizes the notch at the same time the signal is synthesized in the DDS. The simultaneous synthesis of the signal and the notches allows very accurate shaping of the output signal such that spurs in the output signal are substantially eliminated. In addition, as can be observed from the example of FIG. 5, implementation of the method utilizes just a few additional devices thus the ability to create the one or more notches can be done with little if any increase in circuit space or energy.

EXAMPLES AND NOTES

In Example 1, a signal processor configured to receive first signal information and provide second signal information based on the first signal information can include a pulse cataloger configured to analyze the first signal and to provide phase modulation information about the first signal, and a direct digital synthesizer having an output and configured to modulate a second signal using the phase modulation information and to provide the second signal at the output. The second signal can include a representation of the first signal with a frequency notch at a particular center frequency within the bandwidth of the second signal. In certain examples, the phase modulation information can include both phase and amplitude modulation information.

In Example 2, the signal processor of Example 1 optionally includes a channelizer configured to divide the first signal into a plurality of sub-channels, and to provide sub-channel information to the pulse cataloger.

In Example 3, the phase modulation information of any one or more of Examples 1-2 optionally includes sub-channel phase modulation information.

In Example 4, the signal processor of any one or more of Examples 1-3 optionally includes a combiner configured to combine the sub-channel modulation information to provide second signal phase modulation information.

In Example 5, the combiner of any one or more of Examples 1-4 optionally is configured to analyze the sub-channel phase modulation information for phase modulation characteristics that span multiple sub-channels and to supplement the second signal phase modulation with multi-channel phase modulation information associated with the phase modulation characteristics.

In Example 6, the direct digital phase modulation circuit of any one or more of Examples 1-5 optionally includes a comparator circuit configured to receive the second signal phase modulation information.

in Example 7, the comparator circuit of any one or more of Examples 1-6 optionally is configured to derive frequency information of second signal phase modulation information and adjust phase transitions of the second signal phase modulation information if a frequency of the frequency information is within the frequency notch.

In Example 8, the first information of any one or more of Examples 1-7 optionally can include information related to multiple signals received at an antenna coupled to the signal processor, wherein the multiple signals can include a target signal and one or more ambient signals, wherein the signal processor can include a modulation filter configured to receive an output of the combiner and to remove modulation information related to the one or more ambient signals.

In Example 9, the phase modulation information of any one or more of Examples 1-8 optionally can include a first parameter indicative of pulse width of a pulse of the first signal information.

In Example 10, the phase modulation information of any one or more of Examples 1-9 optionally can include a first parameter indicative of a reception time of a pulse of the first signal information.

In Example 11, the phase modulation information of any one or more of Examples 1-10 optionally can include a first parameter indicative of a center frequency the first signal information.

In Example 12, the phase modulation information of any one or more of Examples 1-11 optionally can include a first parameter indicative of an initial phase value the first signal information.

In Example 13, the phase modulation information of any one or more of Examples 1-12 optionally can include a first parameter indicative of an amplitude of the first signal information.

In Example 14, the phase modulation information of any one or more of Examples 1-13 optionally can include inter-pulse modulation information of the first signal information.

In Example 15, a method can include receiving a first signal at a signal processor, generating phase modulation information about the first signal at a pulse cataloger of the signal processor, phase modulating a second signal using a direct digital synthesizer (DDS) and the phase modulation information, providing the second signal at an output of the direct digital synthesizer, and wherein the second signal include a representation of the first signal with a frequency notch at a particular center frequency within the bandwidth of the second signal.

In Example 16, the phase modulating of any one or more of Examples 1-15 optionally includes receiving the phase modulation information at a comparator circuit of the DDS and comparing the phase modulation information to one or more thresholds related to the frequency notch.

In Example 17, the modulating of any one or more of Examples 1-16 optionally includes modifying a phase transition of the second signal when the phase modulation information of the first signal fails to satisfy the one or more thresholds.

In Example 18, the modifying of any one or more of Examples 1-17 optionally includes suppressing a phase transition of the second signal when the phase modulation information of the first signal fails to satisfy the one or more thresholds.

In Example 19, a non-transitory computer readable storage device including instructions, which when executed by a machine, configure the machine to receive a first signal having a first bandwidth, generate phase modulation information about the first signal, phase modulate a second signal using a direct digital synthesizer (DDS) and the phase modulation information, provide the second signal at an output of the direct digital synthesizer, wherein a bandwidth of the second signal is commensurate with the first bandwidth, and wherein the second signal includes a representation of the first signal with a frequency notch at a particular center frequency within the bandwidth of the second signal.

In Example 20, the non-transitory computer readable storage device of any one or more of Examples 1-19 optionally, when executed by a machine, configure the machine to receive the phase modulation information and compare the phase modulation information to one or more thresholds related to the frequency notch, modify a phase transition of the second signal when the phase modulation information of the first signal fails to satisfy the one or more thresholds, and suppress a phase transition of the second signal when the phase modulation information of the first signal fails to satisfy the one or more thresholds.

The above Description of Embodiments includes references to the accompanying drawings, which form a part of the detailed description. The drawings show, by way of illustration, specific embodiments in which methods, apparatuses, and systems discussed herein can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

The flowchart and block diagrams in the FIGS. illustrate the architecture, functionality, and operation of possible implementations of systems, methods and computer program products according to various aspects of the present disclosure. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The functions or processes described herein can be implemented in software, hardware, human implemented procedures, or a combination thereof. The software can consist of computer executable instructions stored on computer readable media such as memory or other type of storage devices. The term "computer readable media" is also used to represent any means by which the computer readable instructions can be received by the computer, such as by different forms of wired or wireless transmissions. Further, such functions correspond to modules, which are software, hardware, firmware or any combination thereof. Multiple functions can be performed in one or more modules as desired, and the embodiments described are merely examples. The software can be executed on a digital signal processor, ASIC, microprocessor, or other type of processor operating on a computer system, such as a personal computer, server or other computer system.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

As used herein, a "-" (dash) used when referring to a reference number means or, in the non-exclusive sense discussed in the previous paragraph, of all elements within the range indicated by the dash. For example, 103A-B means a nonexclusive or of the elements in the range {103A, 103B}, such that 103A-103B includes "103A but not 103B", "103B but not 103A", and "103A and 103B".

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Description of Embodiments, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Description of Embodiments as examples or embodiments, with each claim standing on its own as a separate embodiment, and it is contemplated that such embodiments can be combined with each other in various combinations or permutations. The scope of the subject matter should be determined with reference to the appended claims, along with the full scope of equivalents to which such claims are legally entitled.

What is claimed is:

1. A signal processor configured to receive first signal information about a first signal, the signal processor comprising:
 a pulse cataloger configured to analyze the first signal information and to provide phase modulation information about the first signal;
 a direct digital synthesizer having an output and configured to provide a phase-modulated, second signal using the phase modulation information and to provide the phase-modulated, second signal at the output; and
 wherein the phase-modulated, second signal includes a representation of the first signal with a frequency notch at a particular center frequency within the bandwidth of the phase-modulated, second signal.

2. The signal processor of claim 1, including a channelizer configured to divide the first signal information into a plurality of sub-channels, and to provide sub-channel information to the pulse cataloger.

3. The signal processor of claim 2, where in the phase modulation includes sub-channel phase modulation information.

4. The signal processor of claim 3, including a combiner configured to combine the sub-channel modulation information to provide second signal phase modulation information.

5. The signal processor of claim 4, wherein the combiner is configured to analyze the sub-channel phase modulation information for phase modulation characteristics that span multiple sub-channels and to supplement the second signal phase modulation with multi-channel phase modulation information associated with the phase modulation characteristics.

6. The signal processor of claim 5, wherein the direct digital phase modulation circuit includes a comparator circuit configured to receive the second signal phase modulation information.

7. The signal processor of claim 6, wherein the comparator circuit is configured to derive frequency information of second signal phase modulation information and adjust phase transitions of the second signal phase modulation information if a frequency of the frequency information is within the frequency notch.

8. The signal processor of claim 4, wherein the first information includes information related to multiple signals received at an antenna coupled to the signal processor;
 wherein the multiple signals include a target signal and one or more ambient signals;
 wherein the signal processor includes a modulation filter configured to receive an output of the combiner and to remove modulation information related to the one or more ambient signals.

9. The signal processor of claim 1, wherein the phase modulation information includes a first parameter indicative of pulse width of a pulse of the first signal information.

10. The signal processor of claim 1, wherein the phase modulation information includes a first parameter indicative of a reception time of a pulse of the first signal information.

11. The signal processor of claim 1, wherein the phase modulation information includes a first parameter indicative of a center frequency the first signal information.

12. The signal processor of claim 1, wherein the phase modulation information includes a first parameter indicative of an initial phase value the first signal information.

13. The signal processor of claim 1, wherein the phase modulation information includes a first parameter indicative of an amplitude of the first signal information.

14. The signal processor of claim 1, wherein the phase modulation information includes inter-pulse modulation information of the first signal information.

15. A method comprising:
 receiving a first signal at a signal processor;

generating phase modulation information about the first signal at a pulse cataloger of the signal processor;
phase modulating a second signal using a direct digital synthesizer (DDS) and the phase modulation information to provide a phase-modulated, second signal,
providing the phase-modulated, second signal at an output of the direct digital synthesizer; and
wherein the phase-modulated, second signal includes a representation of the first signal with a frequency notch at a particular center frequency within the bandwidth of the second signal.

16. The method of claim 15, wherein the phase modulation includes receiving the phase modulation information at a comparator circuit of the DDS and comparing the phase modulation information to one or more thresholds related to the frequency notch.

17. The method of claim 16, wherein the modulating includes modifying a phase transition of the second signal when the phase modulation information of the first signal fails to satisfy the one or more thresholds.

18. The method of claim 17, wherein the modifying includes suppressing a phase transition of the second signal when the phase modulation information of the first signal fails to satisfy the one or more thresholds.

19. A non-transitory computer readable storage device including instructions, which when executed by a machine, configure the machine to:
receive a first signal having a first bandwidth;
generate phase modulation information about the first signal;
phase modulate a second signal using a direct digital synthesizer (DDS) and the phase modulation information to provide a phase-modulated, second signal;
provide the phase-modulated, second signal at an output of the direct digital synthesizer;
wherein a bandwidth of the phase-modulated, second signal is commensurate with the first bandwidth, and
wherein the phase-modulated, second signal includes a representation of the first signal with a frequency notch at a particular center frequency within the bandwidth of the second signal.

20. The non-transitory computer readable storage device of claim 19, when executed by a machine, configure the machine to:
receive the phase modulation information and compare the phase modulation information to one or more thresholds related to the frequency notch;
modify a phase transition of the second signal when the phase modulation information of the first signal fails to satisfy the one or more thresholds; and
suppress a phase transition of the second signal when the phase modulation information of the first signal fails to satisfy the one or more thresholds.

* * * * *